United States Patent
Thörn et al.

(10) Patent No.: US 11,011,048 B2
(45) Date of Patent: May 18, 2021

(54) SYSTEM AND METHOD FOR GENERATING A STATUS OUTPUT BASED ON SOUND EMITTED BY AN ANIMAL

(71) Applicant: Sony Mobile Communications Inc., Tokyo (JP)

(72) Inventors: Ola Thörn, Limhamn (SE); Anders Gullander, Lund (SE); Magnus Nambord, Löddeköpinge (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/338,471

(22) PCT Filed: Aug. 2, 2017

(86) PCT No.: PCT/IB2017/054724
§ 371 (c)(1),
(2) Date: Mar. 30, 2019

(87) PCT Pub. No.: WO2018/069774
PCT Pub. Date: Apr. 19, 2018

(65) Prior Publication Data
US 2020/0043309 A1  Feb. 6, 2020

(30) Foreign Application Priority Data

Oct. 13, 2016  (EP) .................................. 16193723

(51) Int. Cl.
*G08B 25/00*  (2006.01)
*G08B 3/10*  (2006.01)
(Continued)

(52) U.S. Cl.
CPC ............. *G08B 25/009* (2013.01); *G08B 3/10* (2013.01); *G08B 13/1672* (2013.01);
(Continued)

(58) Field of Classification Search
CPC .. G08B 3/10; G08B 21/0288; G08B 13/1672; G08B 13/19608; G08B 25/009;
(Continued)

(56) References Cited

U.S. PATENT DOCUMENTS

2014/0232541 A1* 8/2014 Trenkle .................. G08B 25/10
340/539.13
2015/0123796 A1* 5/2015 Trenkle .................. G08B 25/10
340/539.13
(Continued)

FOREIGN PATENT DOCUMENTS

JP  2001325681 A  11/2001
WO  0013393 A1  3/2000
(Continued)

OTHER PUBLICATIONS

International Search Report and Written Opinion from corresponding International Application No. PCT/IB2017/054724, dated Nov. 27, 2017; 9 pages.

Primary Examiner — Orlando Bousono
(74) Attorney, Agent, or Firm — Tucker Ellis LLP (57) ABSTRACT

The disclosure relates to a system for generating a status output based on sound emitted by an animal. The system comprising: a client (102), a server (104) and a database (106); the database (106) is accessible (107) by the server (104) and comprises historic sound data pertaining to the animal (302) or animals of the same type as the animal; the client (102) comprising circuitry (110) configured to: detect (202) sound emitted (308, 312) by the animal (302); record (204) the detected sound (308, 312); analyze (206) the recorded sound for detecting whether the sound (308, 312) comprises a specific sound characteristic out of a plurality of possible sound characteristics, wherein the sound characteristic includes at least one of intensity, frequency and duration of the detected sound; transmit (208), in response to
(Continued)

detecting that the sound (308, 312) comprises the specific sound characteristic, the recorded sound to a server (104); the server (104) comprises circuitry (122) configured to: receive (210) the recorded sound; classify (212) the recorded sound by comparing one or more sound characteristics of the recorded sound with the historic sound data comprised in the database (106); generate (214) the status output based on the classification of the recorded sound. A method (200) for generating a status output based on sound emitted by an animal is also provided.

12 Claims, 3 Drawing Sheets

(51) Int. Cl.
| | |
|---|---|
| *G08B 13/16* | (2006.01) |
| *G08B 13/196* | (2006.01) |
| *G08B 21/02* | (2006.01) |
| *H04W 12/65* | (2021.01) |

(52) U.S. Cl.
CPC ... *G08B 13/19608* (2013.01); *G08B 21/0288* (2013.01); *H04W 12/65* (2021.01)

(58) Field of Classification Search
CPC .. G16H 40/67; A61B 5/0022; A61B 5/02055; A61B 5/1112; A61B 5/681; H04W 12/65
See application file for complete search history.

(56) References Cited

U.S. PATENT DOCUMENTS

2016/0070010 A1* 3/2016 Calupca .............. A01M 31/002
  367/14
2016/0260310 A1  9/2016 Chuang

FOREIGN PATENT DOCUMENTS

WO    2004042670 A2  5/2004
WO  WO 2004/042670 A2 *  5/2004 ............. G08B 23/00

* cited by examiner

SYSTEM AND METHOD FOR GENERATING A STATUS OUTPUT BASED ON SOUND EMITTED BY AN ANIMAL

FIELD OF INVENTION

The invention relates to a system and a method for generating a status output based on sound emitted by an animal. Also a client and a server is presented.

TECHNICAL BACKGROUND

Feeling safe is of fundamental importance to humans. Discomfort or stress is therefore caused if one worries that an event such as a break-in or a trespass should occur, when one is away. Knowledge about the current status of one's home is consequently desirable. It is also reassuring to know that systems such as power, heat and water systems are as they should at home and to know that no damage or destruction is taking place to the home while one is away. It is further comforting to know that a companion animal staying at home is feeling fine.

Many home owners therefore invest in different electronic security systems to feel secure. Prevention of burglary or trespassing is, for instance, hoped to be achieved by monitoring their homes or properties with such systems. The monitoring also allows for detection of failures which may occur at home such as a power cut or a broken heater. The electronic security systems installed in a home are typically built with a control unit configured to communicate with different hardware components such as cameras, thermometers, different types of sensors for windows and doors, and alarms for detecting and alerting in case of a malfunction or safety risk. Most sensors are passive sensors based on "activation", meaning that they will alarm when e.g. a window is broken, a door is opens, the temperature increases or in case of fire or smoke.

Surveillance systems utilizing, for example, network cameras may alternatively or in combination be used to monitor the status of a home.

These security systems are, however, complex as they typically require number of dedicated sensors to provide an adequate surveillance of the home. The wealth of information provided by the hardware components, especially by the cameras, may, moreover, be demanding to handle. Large amount of information may, for instance, put demands on the needed bandwidth and speed for the communication between the security system or surveillance system and a remotely located homeowners or a security company.

There is therefore a need for novel security and surveillance systems having less complexity and which requires reduced amount of information when monitoring the status of a home or the status of an animal such as a dog or cat in the home.

SUMMARY OF INVENTION

It is an object of the invention to provide a system making it technically possible to generate a status output based on sound emitted by an animal.

This object has been achieved by providing a system comprising:
a client, a server and a database;
the database is accessible by the server and comprises historic sound data pertaining to the animal or animals of the same type as the animal;
the client comprising circuitry configured to:
detect sound emitted by the animal;
record the detected sound;
analyze the recorded sound for detecting whether the sound comprises a specific sound characteristic out of a plurality of possible sound characteristics, wherein the sound characteristic includes at least one of intensity, frequency and duration of the detected sound;
transmit, in response to detecting that the sound comprises the specific sound characteristic, the recorded sound to a server;
the server comprises circuitry configured to:
receive the recorded sound;
classify the recorded sound by comparing one or more sound characteristics of the recorded sound with the historic sound data comprised in the database;
generate the status output based on the classification of the recorded sound.

An advantage is that an improved accuracy in generating the status output is obtained. More specifically, knowledge on the status of the animal or of the status of an environment in which the animal is located is efficiently obtained by utilizing the sound emitted by an animal and in particular by utilizing a specific sound characteristic of the sound emitted by an animal. In other words, the provided classification allows for an accurate evaluation of the situation by comparing the specific sound characteristic of the sound emitted by the animal and the historic sound data, i.e. prerecorded sound of the animal or an animal of the same type. The system thereby takes advantage of that the specific sound characteristic of the sound emitted by an animal is indicative of a status of the animal or its surrounding. The type of sound, e.g. the type of barking may thereby be determined.

The complexity of the client is further reduced allowing for a simpler, smaller and more cost effective client. The need for system comprising a number of different sensors is, moreover, reduced. The system further allows for a reduction in usage of bandwidth between the client and the server as the action of transmitting is performed in response to detecting that the sound comprises the specific sound characteristic.

The status output may, for example, be an output such as an alarm indicative of trespassing, break-in, smoke or fire. The status output may be indicative of that the environment of the animal or the animal itself is in an expected normal condition, i.e. the status is status quo. The status output may be indicative of that the behavior of the animal. The status output may indicated if the animal is healthy, ill, sad, happy or distressed. The status output may, for example, be an alarm indicative of that the animal is ill, distressed, angry, sad, or afraid. The status output may, for example, be a sound signal, a text message or a visual indication such as an icon describing or illustrating the status which may be communicated to human having access to the client and/or server via for instance an application software.

The sound emitted by the animal may, for example, be a groan, a scream, a bellow, a whining, a squeak, a mew or a roar. The skilled person realizes that various animals may emit other sounds that may be detected and recorded.

The specific sound characteristic of the sound emitted by an animal may be associated with a mood or behavior of the animal.

The sound emitted by an animal may be a dog barking. As an example, a distressed dog may, for example, emit characteristic sound, which may also be referred to a as a guard bark, when the dog feels the need to defend himself/herself against a perceived threat as will be described further below.

The intensity, frequency and/or duration of the guard bark may thereby be analyzed and classified based on which the status output threat may be generated. The specific sound characteristic may be construed as a sound which in its intensity, frequency, and/or duration is distinctive to other sounds emitted by the animal. A change in the frequency, intensity and or duration of the sound may be indicative of a mood change of the animal. As an example, an increased loudness and duration of the sound emitted by the animal may be characteristic indicating that the animal is upset.

The historic sound data may comprise recorded sounds generated previously by the animal. The historic sound data may in addition or alternatively comprise recorded sounds generated by animals of the same type as the animal. The animals of the same type may be animals of the same species of animals and/or the same breed of the animal.

The animal may, for example, be a dog and the same breed of the animal may e.g. be the same breed of dog.

The environment may, for example be a property or a home.

The client may be configured as a wearable device to be worn by the animal. The client may be arranged separately from the animal.

The circuitry of the client may further comprise a motion sensor configured to sense a motion of the animal, and wherein the circuitry of the client further is configured to transmit the sensed motion to the server;
wherein the circuitry of the server is further configured to:
receive the sensed motion;
generate the status output based on the classification of the recorded sound and the sensed motion.

The circuitry of the client may further comprise a motion sensor configured to sense a motion of the animal, and wherein the circuitry of the client further is configured to transmit, in response to detecting that the sound comprises the specific sound characteristic, the sensed motion to the server;
wherein the circuitry of the server is further configured to:
receive the sensed motion;
generate the status output based on the classification of the recorded sound and the sensed motion.

The circuitry of the server may further be configured to store the sensed motion.

The circuitry of the client may further comprise a motion sensor configured to sense a motion of the animal, wherein the circuitry of the client is further configured to:
determine whether the movement of the animal is above a predetermined threshold; and
transmit, in response to detecting that the sound comprises the specific sound characteristic and that the movement is determined to be above the predetermined threshold, the recorded sound to a server.

The speed and/or acceleration of the animal may thereby be measured. An advantage is that the motion of the animal may be determined which may be associated with a behavior or mood or the animal.

The circuitry of the client may further comprise a location sensor configured to sense a location of the animal, and wherein the circuitry of the client further is configured to transmit the location of the animal to the server;
wherein the circuitry of the server is further configured to:
receive the location of the animal;
generate the status output based on the classification of the recorded sound and the location of the animal.

The circuitry of the client may further comprise a location sensor configured to sense a location of the animal, and wherein the circuitry of the client further is configured to transmit, in response to detecting that the sound comprises the specific sound characteristic, the location of the animal to the server;
wherein the circuitry of the server is further configured to:
receive the location of the animal;
generate the status output based on the classification of the recorded sound and the location of the animal.

The circuitry of the server may further be configured to store the location of the animal.

The circuitry of the client may further comprise a location sensor configured to sense a location of the animal, wherein the circuitry of the client is further configured to:
determine whether the location of the animal is within a predetermined area; and
transmit, in response to detecting that the sound comprises the specific sound characteristic and that the location of the animal is determined to be within the predetermined area, the recorded sound to a server.

The location of the animal may thereby be determined. An advantage is that the system may determine where the animal is located in for instance a room or a house. It is further possible to determine if the animal is at a given location. The location may further be a predetermine area. The predetermine area may be a sub-portion of a room, a house or a garden. The location may thereby be determined to be within a predetermined area of a house such as an area in the vicinity of a window, a door, or in the kitchen or at an attic. The location of the animal may be indicative of if an event is occurring at a given location. A comparison or correlation between the location of the animal and the detected sound emitted by the animal may further be used for the classification. An improved classification and generation of status output may thereby be provided.

The system may further comprise a camera configured to capture images of a scene comprising the animal, wherein the circuitry of the server is further configured to:
retrieve images captured by the camera;
analyze the images captured by the camera for identifying action behavior of the animal;
generate the status output based on the classification of the recorded sound and the identified action behavior of the animal.

A comparison or correlation between identified action behavior of the animal and the detected sound emitted by the animal may thereby be used for the classification. The action behavior of the animal may, for example, be a pose, a movement, a gait or a grimace of the animal. The action behavior may be a turning of the head, a yawning, a shaking a tail position, a shivering, a blinking, a paw lift etc. An improved determination of the status of a scene or the status of the animal in a scene may thereby be provided. The accuracy of the generated status output may thereby be increased. The probability for a false alarm is thereby reduced. Demands on the needed bandwidth and speed for the communication between the system and a remotely located homeowners or a security company is further reduced.

The camera may be activated by the, by the client, detected sound emitted by the animal.

The server may be configured to activate the camera based on receiving the recorded sound.

Advantage enhanced privacy in the premises comprising the camera.

The system may further comprise a sensor configured to monitor premises wherein the animal is located, wherein the sensor is accessible by the server, wherein the circuitry of the server is further configured to:

generate the status output based on the classification of the recorded sound and monitoring data monitored by the sensor.

The system may thereby acquire additional information on the status of an environment where the sensor is arranged. The sensors may, for example, be a temperature sensor, water sensor, a smoke sensor, a contact sensors or a glass break sensor allowing for determination if related events has occurred.

The circuitry of the client may comprise a communication module configured to transmit the recorded sound to the server, wherein the communication module is further configured to be activated in response to the circuitry of the client detecting that the sound comprises the specific sound characteristic.

An advantage is that prolonged battery life time of the client may thereby be obtained.

The circuitry of the client may comprise a piezo microphone configured to detect the sound emitted by the animal.

An advantage is that a battery life time of the client is prolonged because the piezo microphone will be active by the sound itself.

According to a second aspect a method for generating a status output based on sound emitted by an animal is provided. The method comprising:

detecting, at a client, sound emitted by the animal;

recording, at the client, sound emitted by the animal;

analyzing, at the client, the recorded sound for detecting whether the sound comprises a specific sound characteristic out of a plurality of possible sound characteristics, wherein the sound characteristic includes at least one of intensity, frequency and duration of the detected sound;

in response to detecting that the sound comprises the specific sound characteristic transmitting, by the client, the recorded sound to a server;

receiving the recorded sound at the server;

classifying, at the server, the recorded sound by comparing one or more sound characteristics of the recorded sound with historic sound data pertaining to the animal or animals of the same type as the animal, the historic sound data being stored in a database accessible by the server;

generating, at the server, the status output based on the classification of the recorded sound.

The above mentioned features of the system, when applicable, apply to this second aspect as well. In order to avoid undue repetition, reference is made to the above.

The act of classifying may further comprise taking into account location specific event data.

The location event data may comprise information on planed activities in the area such as construction, garbage and recycling collection. The location event data may comprise information on crime activity e.g. burglary activity in the area, national holidays, or ongoing events in the area such as demonstrations, parades or festivals.

Information on location specific event which may influence the behavior of an animal may thereby be use in the classification. A more accurate status output may thereby be generated.

The status output may be an alarm signal, wherein the method further comprises sending the alarm signal from the server to a monitoring center. The monitoring center may be a security company. The monitoring center may be in the form of a software application on an electronic device such as a computer, a digital assistant, a smart phone, a mobile phone or a wearable device such as a smart watch or a smart wrist band.

The alarm may be designed to warn of burglaries or trespassers. The alarm may be a silent alarm sent to a monitoring center provided by the police or security guards which are warned without indication to the burglar. The alarm may alternatively or in combination be an alarm which gives an audible, visual or other form of alarm signal about a status to indicate if an event such condition has occurred. The alarm may be a sent out as a visible and/or audible signal by a siren.

The status output may be a health indicator for the animal. The health indicator may be a characteristic of the animal such as calm, happy, distressed, afraid, angry, hungry, sleepy, healthy or ill.

The heal indicator may indicative of health, mood, or behavioral changes that develop in response to an illness causing, for example, an animal to limit its movement or location, changing its stance, gait or vocalization.

The method may further comprise upon generating the status output, updating the historic data in the database.

An improved and more reliable database may thereby be built up. Subsequent classification using the database may thereby be improved in accuracy.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
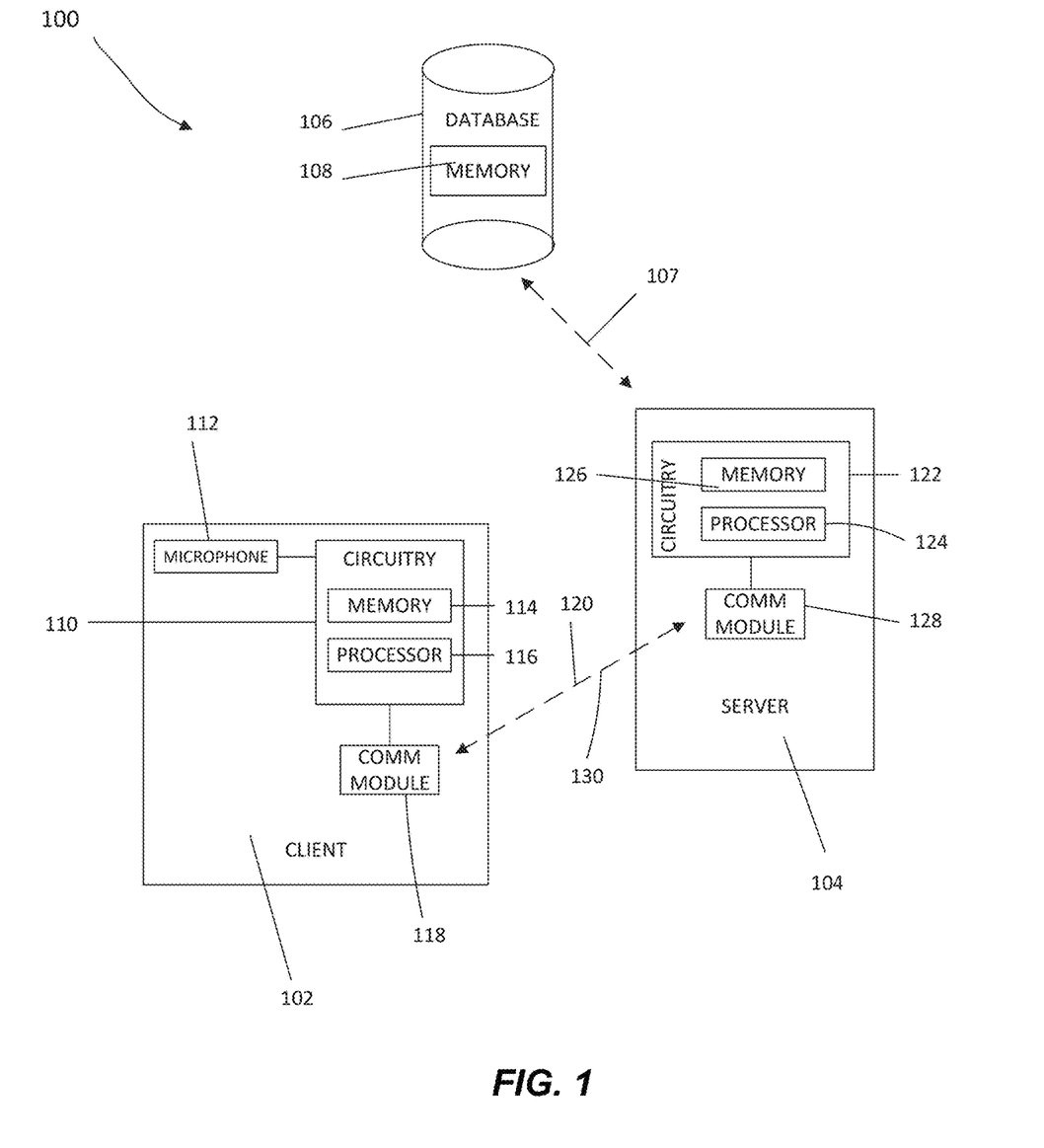
FIG. 1 is a schematic drawing of a system for generating a status output based on sound emitted by an animal.
Figure 2:
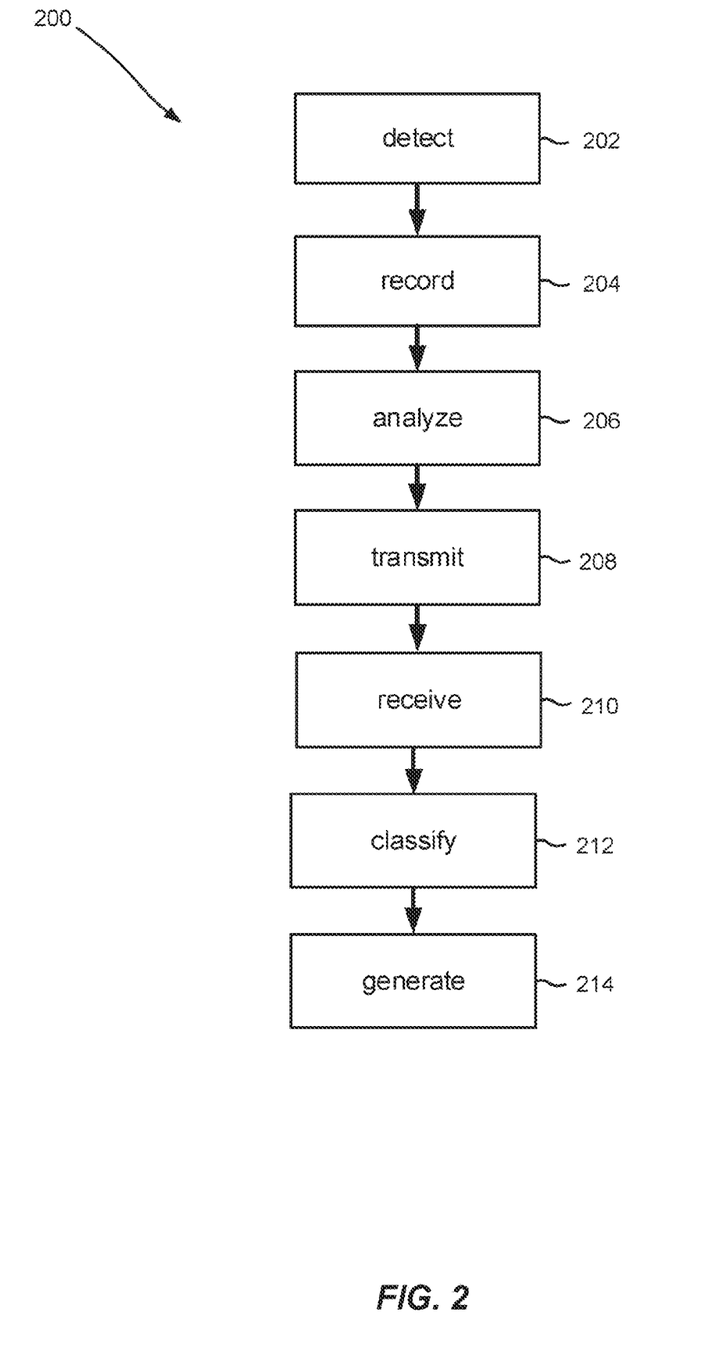
FIG. 2 illustrates a block diagram of a method 200 for generating a status output based on sound emitted by an animal.

In the following a system and a method for generating a status output based on sound emitted by an animal are described in relation to FIGS. 1-3. FIG. 1 illustrates a schematic view of the system 100 and FIG. 2 illustrates a block diagram of a method 200.

The system 100 comprises a client 102, a server 104 and a database 106. The database 106 is here illustrated as a separate unit to the server 104 but may alternatively be comprised in the server 104. In case the database 106 is a separate unit to the server 104, the database 106 is accessible 107 by the server 104 via wireless or wired communication over a communication network. The database 106 may comprise a memory 108 on to which historic sound data pertaining to the animal or animals of the same type as the animal may be stored.

The client 102 comprises circuitry 110. The circuitry 102 may comprise different modules such as a microphone 112, a memory 114, a processor 116 and a communication module 118. Modules of the circuitry are implemented as a dedicated hardware portion, a hardware portion configured to run software such as firmware, resident software, microcode, etc, or a combination thereof.

The microphone 112 is configured to detect 202 and record 204 sound emitted by an animal. The recorded sound may be stored on the memory 114.

The processor 116 is configured to run software analyzing 206 the recorded sound for detecting whether the sound comprises a specific sound characteristic out of a plurality of possible sound characteristics, wherein the sound characteristic includes at least one of intensity, frequency and duration of the detected sound.

The communication module 118 is configured to, in response to detecting that the sound comprises the specific sound characteristic, transmit 120 the recorded sound to the server 104, see also the action of transmitting 208 of the method 200.

Thus, the processor 116 may be understood to be configured to identify and filter out or to select a sound comprising the specific sound characteristic out of a plurality of possible sound characteristics. The amount of data pertaining to the sound transmitted 120 from the client 102 to the server 104 may thereby be reduced.

The processor 116 and the memory 114 may further be configured to only store sounds comprising the specific sound characteristic out of a plurality of possible sound characteristics. The data storage capacity of the memory 114 may thereby be reduced.

The server 104 comprises circuitry 122. The circuitry 122 may comprise different modules such as a processor 124, a memory 126 and a communication module 128. Modules of the circuitry are implemented as a dedicated hardware portion, a hardware portion configured to run software such as firmware, resident software, micro-code, etc, or a combination thereof. The server 104 is configured to receive 130, 210, via the communication module 128, the recorded sound transmitted 120, 208 from the client 104. The received 130, 210 recorded sound may be stored on the memory 126. The processor 124 of the server may be configured to run software classifying 212 the recorded sound by comparing one or more sound characteristics of the recorded sound with the historic sound data comprised in the database 106; The processor 124 may further be configured to run software generating 214 the status output based on the classification of the recorded sound.

Figure 3:
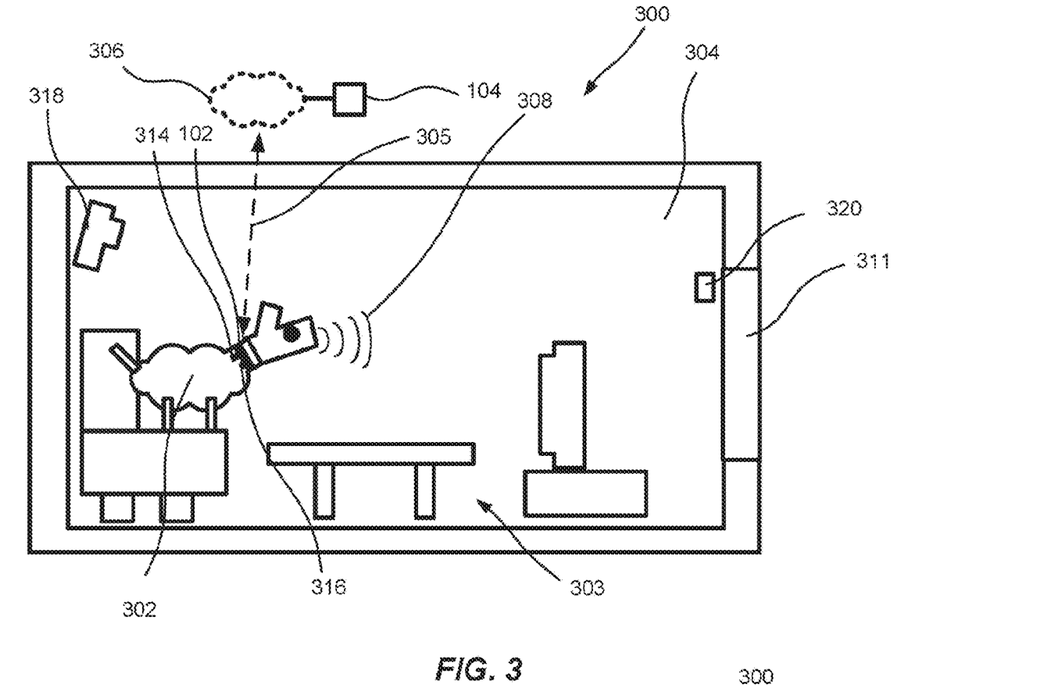
FIG. 3 illustrates an example of a system 300 for generating a status output based on sound emitted by an animal.
Figure 4:
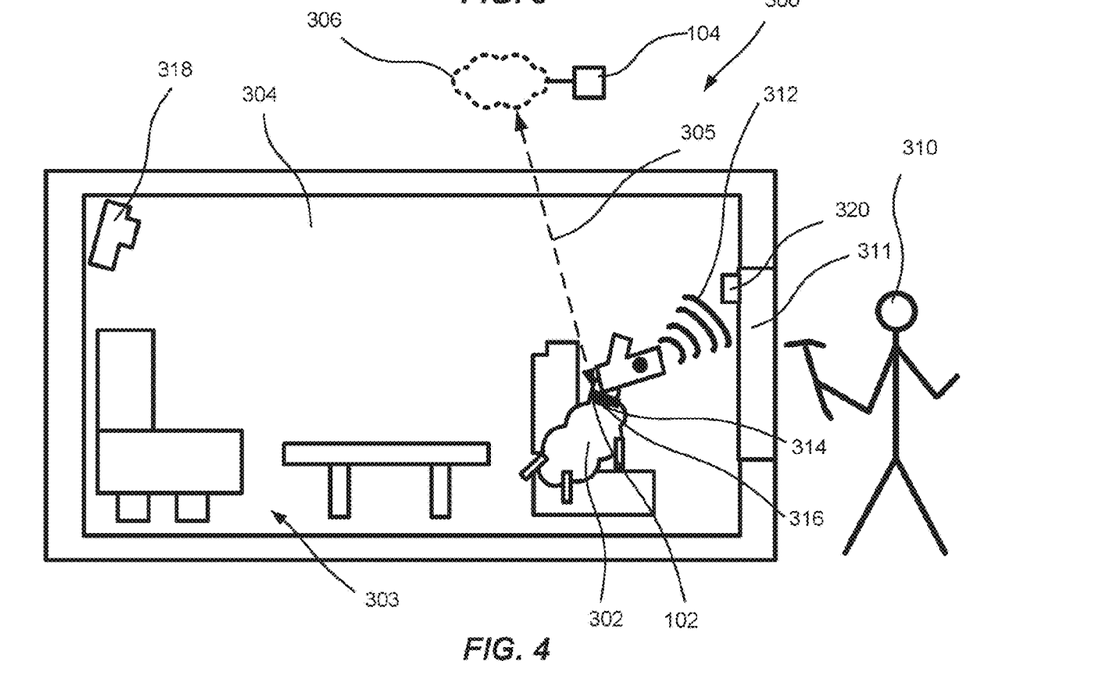
FIG. 4 illustrates an example of a system 300 for generating a status output based on sound emitted by an animal.

With reference to FIGS. 3 and 4 an example is provided illustrating a system 300 for generating a status output based on sound emitted by an animal. The animal is in this example a dog 302 located in the living room 304 of a house. The living room has furniture 303 comprising a sofa, a table and a television system. The system 300 comprises a client 102 and a server 104, the server comprising a data base 106. The client 102 and the server 104 are in communication 305 via wireless communication system 306. The wireless communication system 306 may be a cloud based communication system.

The client 102 is configured as a wearable device to be worn by the dog 302 as a collar. The client 102 comprises, as discussed in relation to FIG. 1, circuitry 110 configured to detect 202 sound 308 emitted by the animal and to record 204 the sound 308. The circuitry of the client 102 is further configured to analyze 206 the recorded sound 308 for detecting whether the sound 308 comprises a specific sound characteristic out of a plurality of possible sound characteristics, wherein the sound characteristic includes at least one of intensity, frequency and duration of the detected sound. The sound 308 may, for example, comprise sound characteristics which are in intensity, frequency or duration indicative of a harmonic play bark for the dog 302. The client 102 may, as in this example, be configured to upon detection of this sound 308 ignore and delete it from the memory of the client as it indicative of that the status for the dog 302.

FIG. 4 illustrated the same dog 302 and the same living room 304 at another point in time. The dog 302 has now identified a person 310 attempting to break into the living room 304. The dog 302 has moved towards the window 311 and barks intensively. The sound 312 emitted by the dog 302 may in this example be described as a threat bark or warning bark having a characteristic low-pitched sound. The sound 312 may, for example, be higher in intensity, longer in duration and lower frequency than the sound 308 described above.

The client 102 detects 202 and records 204 the sound 312. The circuitry 110 of the client 102 analyzes 206 the recorded sound for detecting whether the sound comprises a specific sound characteristic out of a plurality of possible sound characteristics, wherein the sound characteristic includes at least one of intensity, frequency and duration of the detected sound. The sound 312 may thereby be identified as comprising a specific sound characteristic. The client 102 then transmit 208, in response to detecting that the sound comprises the specific sound characteristic, the recorded sound to a server. The server 104 receives 210 the recorded sound and classifies 212 it by comparing one or more sound characteristics of the recorded sound with the historic sound data comprised in the database. The sound 312 is thereby identified as a warning sound and the server 104 generates 214 status output based on the classification of the recorded sound. The status output is here a warning or alarm signal sent to the owner of the dog and/or a monitoring center such as a security company having access to information pertaining to the status output generated by the system 300.

The status output of the system 300 may trigger a siren or a loud speaker in order to frighten the burglar 310. The loud speaker may be configured to amplify the sound emitted 312 by the dog 302.

It should be noted that the sound 308 disclosed above may alternatively be analyzed and detected as a sound comprising a specific sound characteristic which is transmitted 305 to a server 306. The server may thereafter classify the recorded sound by comparing one or more sound characteristics of the recorded sound with the historic sound data comprised in the database and generate the status output based on the classification of the recorded sound. The status output may be indicative of that the dog is having a good time at home which may be reassuring to the owner of the dog. The status output may, moreover, a health indicator for the animal.

The circuitry 110 of the client 102 may further comprise a motion sensor 314 configured to sense a motion of the dog 302. The circuitry 110 of the client 102 may further be configured to transmit 305, the sensed motion to the server 104. The circuitry 122 of the server 104 may also be configured to receive the sensed motion and generate the status output based on the classification of the recorded sound and the sensed motion.

The motion sensor 314 may further be configured to sense a motion of the dog 302. The circuitry of the client 102 may further be configured to determine whether the movement of the dog 302 is above a predetermined threshold. The predetermined threshold may, for example, be a normal acceleration or speed at which the dog moves in the house under normal circumstances, e.g. in when the animal is not angry or afraid. The circuitry 110 of the client 102 may further be configured to transmit, in response to detecting that the sound comprises the specific sound characteristic and that the movement is determined to be above the predetermined threshold, the recorded sound to the server 104.

The client 102 may thereby detect an acceleration or speed of the dog 302, for instance, when the dog 302 runs to the window 311. The detected motion may thereby trigger a transmission 305 of recorded sound from the client 102 to the server 104.

A comparison or correlation between the detected sound and the detected motion may further be provided. An improved classification and generation of status output may additionally be provided.

The circuitry 110 of the client 102 may further comprise a location sensor 316 such as a GPS or a local area network location estimator. The location sensor 316 may be configured to sense a location of the dog, and the circuitry of the client 102 may be configured to transmit the location of the dog to the server 104.

The circuitry 110 of the server 104 may further configured to receive the location of the animal and generate the status output based on the classification of the recorded sound and the location of the dog 302.

The location sensor 316 may further be configured to sense a location of the animal 302, and the circuitry 110 of the client 102 may be configured to determine whether the location of the animal is within a predetermined area; and transmit, in response to detecting that the sound comprises the specific sound characteristic and that the location of the animal is determined to be within the predetermined area, the recorded sound to a server 104.

The location sensor 314 may thereby detect that the dog 302, which is normally located in the centre of the living room 304, preferably lying on the sofa, but when hearing the burglar 310 moves to a location at the window.

The system 300 may further comprise a camera 318. The camera 318 may be configured to capture images of a scene comprising the animal, e.g. to image the living room 304 and the dog 302. The circuitry of the server 104 may further be configured to retrieve images captured by the camera 318 and analyze the images captured by the camera 318 for identifying action behavior of the dog 302 such as the aggressive behavior of the dog 302 described above. The server 104 may generate a status output based on the classification of the recorded sound and the identified action behavior of the dog 302. An improved determination of the status in the room 304 or the status of the dog 302 may thereby be provided.

The server 104 may be configured to activate the camera 318 based on receiving the recorded sound. The recorded sound may thereby trigger the camera 318 to switch from non-imaging to an imaging mode. Advantage being that enhanced privacy in the premises comprising the camera 318 is obtained. The amount of data, e.g. as images or video content, for monitoring the room 304 may further be reduced.

The data generated by the camera 318 may be accessible to the server 104, not shown.

The system 300 may comprise a sensor 320 configured to monitor premises wherein the dog 302 is located, i.e. the living room 304. The sensor 320 may be accessible, not shown, by the server 104. The circuitry of the server 104 may further be configured to generate the status output based on the classification of the recorded sound and monitoring data monitored by the sensor 320. The sensor 320 may, for example, be a glass break sensor sensing if the burglar 310 brakes the window 311.

The act of classifying may further comprise taking into account location specific event data. The person 310 may, for example, be a carpenter or a window cleaner which is scheduled to fix or clean the window.

Information on the location specific event which may influence the behavior of an animal may thereby be taken into account in the classification. A more accurate status output may thereby be generated. The probability to generate status output being a false alarm may thereby be reduced.

The circuitry of the client may comprise a communication module configured to transmit the recorded sound to the server, wherein the communication module is further configured to be activated in response to the circuitry of the client detecting that the sound comprises the specific sound characteristic.

Advantage prolonged battery life time of the client may thereby be obtained.

The circuitry of the client comprises a piezo microphone configured to detect the sound emitted by the animal.

An advantage is that a battery life time of the client is prolonged because the piezo microphone will be active by the sound itself.

The person skilled in the art realizes that the present invention by no means is limited to the preferred embodiments described above. On the contrary, many modifications and variations are possible within the scope of the appended claims.

For example, the method described above may further comprise upon generating the status output, updating the historic data in the database. The information comprised in the database may thereby be improved. A better classification may thereby be made. A change to the characteristics of the sounds emitted by the animal, for instance as a result of aging, may thereby be taken into account.

The scene described above is illustrated as a living room 304 of a house, but the scene at which the animal is located may, for example, be an office building, or an animal day care or a property surrounding a building.

The animal is described above as being a dog. The skilled person realizes that sounds emitted from other animals may be detected and analyzed. The animal may, for example, be a horse, a cow, a cat, a pig or a sheep. Knowledge on the status of an animal or on the status of an environment in which the animal is located may thereby be efficiently obtained. The system and method may thereby take advantage of that the specific sound characteristic of the sounds emitted by the animals are indicative of a status of the animal or its surrounding.

The client may be comprised in or attached to a harness or band attached to the animal.

The client may be arranged at a distance to the animal. The client may be arranged in the premises of the animal.

The server may be arranged in the same premises as the client.

The database may be comprised in the server or separate from, but accessible to the server.

The method may further comprise, in response to detecting that the sound comprises the specific sound characteristic, activating a communication module of the client, wherein the act of transmitting the recorded sound to a server is performed by the communication module.

The system and method described above takes advantage of that the hearing range of an animal may be greater that the hearing range of a human. Hearing range describes the range of frequencies that can be heard by humans or animals, though it can also refer to the range of levels. The human range is commonly given as 20 to 20,000 Hz. The hearing ability of a dog is dependent on breed and age, though the range of hearing is usually around 67 Hz to 45 kHz, which is a range of 9 octaves. Humans hear a range of about 10 octaves. As dogs may hear higher frequency sounds than humans, they have a different acoustic perception of the world.

The server may use machine learning to classify the recorded sound emitted by the animal. The sound emitted may, for example, be a barking of a dog. The server may then use machine learning on the barking and compare it with the dog's history, dogs of the same type, etc.

Additionally, variations to the disclosed embodiments can be understood and effected by the skilled person in practicing the claimed invention, from a study of the drawings, the disclosure, and the appended claims.

The invention claimed is:

1. A client comprising:
    a microphone configured to detect sound emitted by an animal;
    a motion sensor configured to sense a motion of the animal;
    a memory configured to record the detected sound;
    a processor configured to:
        analyze the recorded sound for detecting whether the sound comprises a specific sound characteristic out of a plurality of possible sound characteristics, wherein the sound characteristic includes at least one of intensity, frequency and duration of the detected sound, and
        determine whether the motion of the animal is above a predetermined threshold; and
    a communication module configured to, in response to and as a result of detecting that the sound comprises the specific sound characteristic and that the motion is determined to be above the predetermined threshold, transmit the recorded sound.

2. The client according to claim 1, wherein the client is configured as a wearable device to be worn by the animal.

3. The client according to claim 1, wherein the communication module is further configured to transmit the sensed motion.

4. The client according to claim 1, further comprising a location sensor configured to sense a location of the animal, wherein the communication module is further configured to transmit the location of the animal.

5. A method for analyzing sound emitted by an animal, the method comprising:
    detecting, at a client, sound emitted by the animal;
    recording, at the client, sound emitted by the animal;
    analyzing, at the client, the recorded sound for detecting whether the sound comprises a specific sound characteristic out of a plurality of possible sound characteristics, wherein the sound characteristic includes at least one of intensity, frequency and duration of the detected sound;
    sensing a location of the animal;
    determining whether the location of the animal is within a predetermined area; and
    transmitting the recorded sound in response to and as a result of detecting that the sound comprises the specific sound characteristic and that the location of the animal is determined to be within the predetermined area.

6. The method of claim 5, wherein the client is configured as a wearable device to be worn by the animal.

7. The method of claim 5, further comprising:
    sensing a motion of the animal; and
    transmitting the sensed motion.

8. The method of claim 5, further comprising:
    sensing a motion of the animal;
    determining whether the motion of the animal is above a predetermined threshold; and
    transmitting, in response to detecting that the sound comprises the specific sound characteristic and that the movement is determined to be above the predetermined threshold, the recorded sound.

9. The method of claim 5, further comprising:
    transmitting the location of the animal.

10. The method of claim 5, further comprising:
    activating a communication module in response to detecting that the sound comprises the specific sound characteristic, wherein the communication module transmits the recorded sound.

11. A method for analyzing sound emitted by an animal, the method comprising:
    detecting, at a client, sound emitted by the animal;
    recording, at the client, sound emitted by the animal;
    analyzing, at the client, the recorded sound for detecting whether the sound comprises a specific sound characteristic out of a plurality of possible sound characteristics, wherein the sound characteristic includes at least one of intensity, frequency and duration of the detected sound;
    sensing a location of the animal;
    determining whether the location of the animal is within a predetermined area; and
    transmitting the recorded sound in response to detecting that the sound comprises the specific sound characteristic and that the location of the animal is determined to be within the predetermined area, wherein the location of the animal is a location within a house and the predetermined area is a predetermined area of the house.

12. The method of claim 11, wherein the location of the animal is a location within a room and the predetermined area is a sub-portion of the room.

* * * * *